(12) United States Patent
Lu

(10) Patent No.: US 7,787,550 B2
(45) Date of Patent: Aug. 31, 2010

(54) COMBINED FRAME ALIGNMENT AND TIMING RECOVERY IN DIGITAL SUBSCRIBER LINE (DSL) COMMUNICATIONS SYSTEMS

(75) Inventor: Jin Lu, Fremont, CA (US)

(73) Assignee: Texas Instruments Incorporated, Dallas, TX (US)

( * ) Notice: Subject to any disclaimer, the term of this patent is extended or adjusted under 35 U.S.C. 154(b) by 572 days.

(21) Appl. No.: 11/782,101

(22) Filed: Jul. 24, 2007

(65) Prior Publication Data

US 2009/0028252 A1 Jan. 29, 2009

(51) Int. Cl.
*H04K 1/10* (2006.01)
(52) U.S. Cl. .................. 375/260; 375/222; 375/344
(58) Field of Classification Search .......... 375/222, 375/344, 260
See application file for complete search history.

(56) References Cited

U.S. PATENT DOCUMENTS

| | | | |
|---|---|---|---|
| 6,009,132 A | 12/1999 | Scholtz | |
| 6,370,188 B1 * | 4/2002 | Wu et al. | 375/222 |
| 6,442,173 B1 | 8/2002 | Barsoum et al. | |
| 6,643,340 B1 * | 11/2003 | Strait | 375/354 |
| 6,643,343 B1 | 11/2003 | Miller, II et al. | |
| 6,954,505 B2 * | 10/2005 | Gatherer et al. | 375/260 |
| 6,983,032 B2 | 1/2006 | Mujica et al. | |
| 6,985,548 B1 | 1/2006 | Jabbar et al. | |
| 2003/0065995 A1 * | 4/2003 | Barrett | 714/715 |
| 2003/0156603 A1 * | 8/2003 | Rakib et al. | 370/485 |
| 2005/0169392 A1 | 8/2005 | Redfern | |
| 2005/0286649 A1 * | 12/2005 | Redfern | 375/260 |

OTHER PUBLICATIONS

Texas Instruments Incorporated, "AC7 ADSL Infrastructure Chipset," 2003.*
Texas Instruments Incorporated, "AFE1302 ADSL Analog Front End", 2000.*
ITU-T G.992.1, "Asymmetric digital subscriber line (ADSL) transceivers" (International Telecommunication Union, Jun. 1999).
ITU-T G.992.3, "Asymmetric digital subscriber line transceivers 2 (ADSL2)", (International Telecommunication Union, Jan. 2005).

* cited by examiner

*Primary Examiner*—Juan A Torres
(74) *Attorney, Agent, or Firm*—Steven A. Shaw; W. James Brady; Frederick J. Telecky, Jr.

(57) ABSTRACT

Timing recovery circuitry for a digital subscriber line (DSL) modem, including a combined frame and timing function for adjusting frame alignment, and for adjusting sample frequency for frequency offset and for phase offset. Frame alignment is adjusted by averaging estimates of the phase offset over multiple tones within a frame, and then averaging that average estimated phase offset over multiple frames to produce a frame offset measurement. Frequency offset is derived from the constant rate of phase error variation in the received signal varies over a sequence of frames, based on which the sample frequency of the modem is adjusted. Phase offset is determined by averaging the phase offset over a plurality of tones within a frame, and integrating differences in this phase offset from frame to frame.

22 Claims, 6 Drawing Sheets

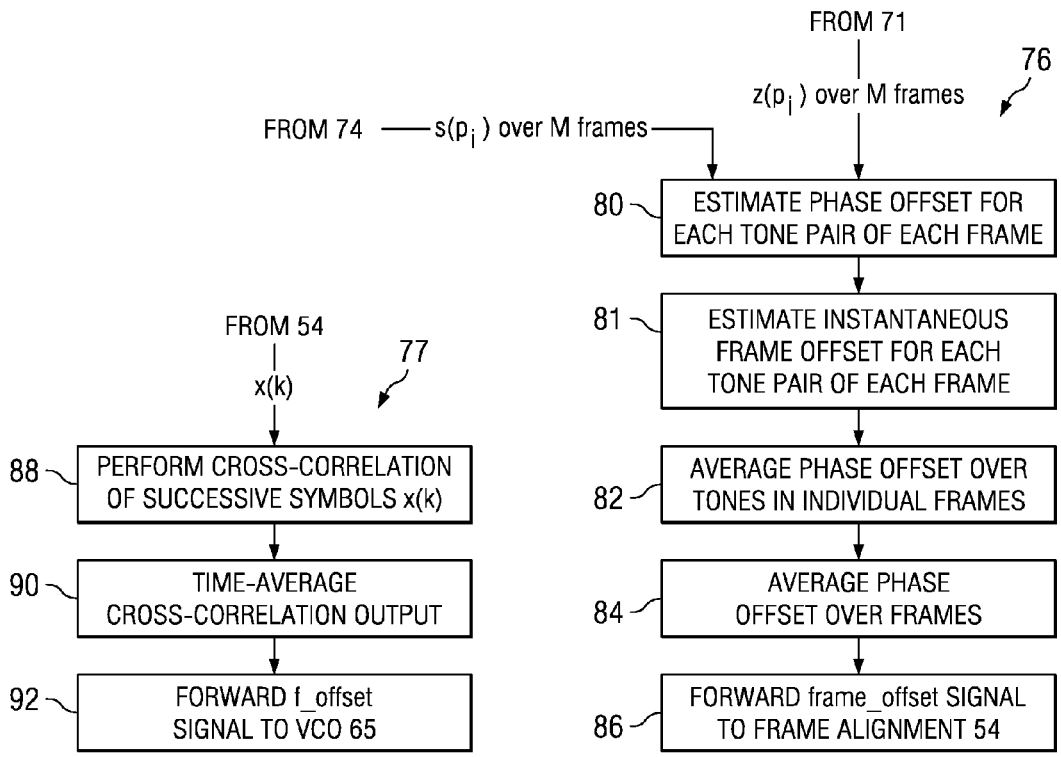
FIG. 7b
FIG. 7a
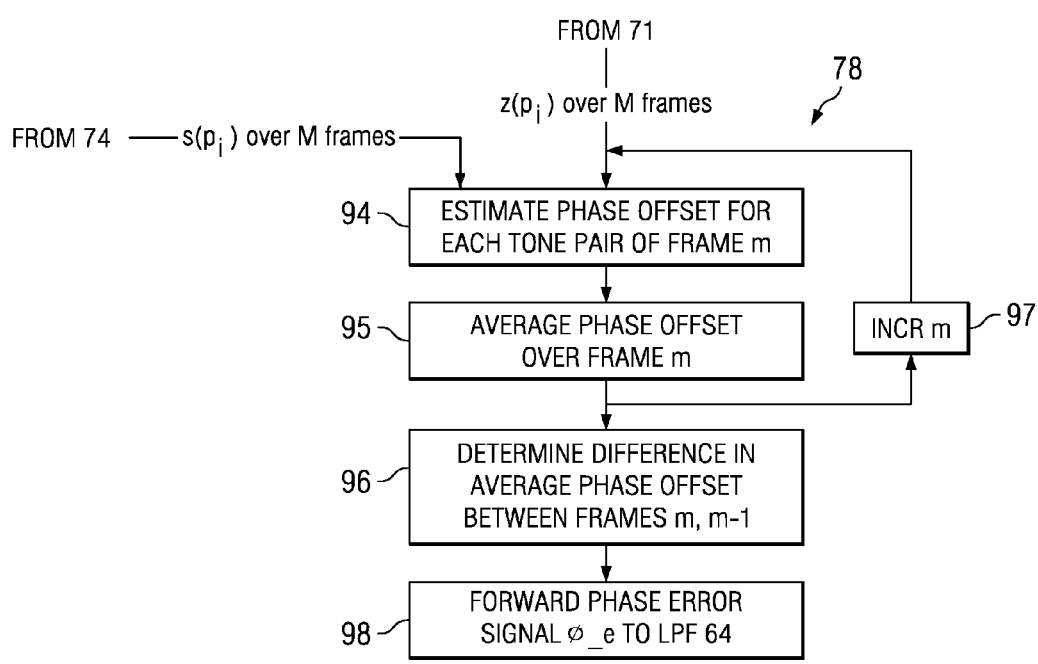
FIG. 7c

COMBINED FRAME ALIGNMENT AND TIMING RECOVERY IN DIGITAL SUBSCRIBER LINE (DSL) COMMUNICATIONS SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of digital communications, and is more specifically directed to timing recovery from received signals in such communications.

Digital Subscriber Line (DSL) technology has become a primary technology providing high-speed Internet access, and now video and telephone communications, in the United States and around the world. As is well known in the art, DSL communications are carried out over existing telephone "wire" facilities, between individual subscribers and a central office (CO) location, operated by a telephone company or an Internet service provider. Typically, some if not all of the length of the loop between the CO and the customer premises equipment (CPE) consists of conventional twisted-pair copper telephone wire. Remarkably, modern DSL technology is able to carry out extremely high data rate communications, even over reasonably long lengths (e.g., on the order of 15,000 feet) of twisted-pair wire, and without interfering with conventional voiceband telephone communications, carried out over the twisted-pair wire simultaneously with the DSL data communications.

Modern DSL communications achieve these high data rates through the use of multicarrier modulation (MCM) techniques, more specifically discrete multitone modulation (DMT), by way of which the data signals are modulated onto orthogonal tones, or subcarriers, within a relatively wide frequency band (on the order of 1.1 MHz for conventional ADSL, and on the order of 2.2 MHz for ADSL2+), residing above the telephone voice band. The data symbols modulated onto each subchannel are encoded as points in a complex plane, according to a quadrature amplitude modulation (QAM) constellation. The number of bits of data that are carried over each subchannel (i.e., the "bit loading"), and thus the number of points in the QAM constellation for that subchannel, depend on the signal-to-noise ratio (SNR) at the subchannel frequency, which in turn depends on the noise and signal attenuation present at that frequency. For example, relatively noise-free and low attenuation subchannels may communicate data in ten-bit to fifteen-bit symbols, represented by a relatively dense QAM constellation with short distances between constellation points. On the other hand, noisy channels may be limited to only two or three bits per symbol, requiring a greater distance between adjacent points in the QAM constellation to resolve the transmitted symbol. The sum of the bit loadings over all of the subchannels in the transmission band for a DSL link of course amounts to the number of transmitted bits per DSL symbol for that link. And the data rate for DSL communications corresponds to the product of the symbol rate with the number of bits per DSL symbol.

FIG. 1 illustrates the data flow in conventional DSL communications, in a single direction (e.g., downstream, from a central office "CO" to customer premises equipment "CPE"). Typically, each DSL modem (i.e., both at the CO and also in the CPE) includes a transceiver (i.e., both a transmitter function and a receiver function), so that data is also communicated in the opposite direction over transmission channel LP according to a similar DMT process. As shown in FIG. 1, the input bitstream that is to be transmitted, typically a serial stream of binary digits in the format as produced by the data source, is applied to constellation encoder 11 in a transmitting modem 10. Constellation encoder 11 fundamentally groups the bits in the input bitstream into multiple-bit symbols that are used to modulate the DMT subchannels, with the number of bits in each symbol determined according to the bit loading assigned to its corresponding subchannel, based on the characteristics of the transmission channel as mentioned above. Encoder 11 may also include other encoding functions, such as Reed-Solomon or other forward error correction coding, trellis coding, turbo or Low Density Parity Check (LDPC) coding, and the like. The symbols generated by constellation encoder 11 correspond to points in the appropriate modulation constellation (e.g., QAM), with each symbol associated with one of the DMT subchannels. Following constellation encoder 11, shaping function 12 derives a clip prevention signal included in the encoded signals to be modulated, to reduce the peak-to-average ratio (PAR) as transmitted as described in commonly assigned U.S. Pat. No. 6,954,505, issued Oct. 11, 2005, and incorporated herein by this reference.

These encoded symbols are applied to inverse Discrete Fourier Transform (IDFT) function 13, which associates each symbol with one subchannel in the transmission frequency band, and generates a corresponding number of time domain symbol samples according to the Fourier transform. As known in the art, cyclic insertion function 14 appends a cyclic prefix or suffix, or both, to the modulated time-domain samples from IDFT function 13, and presents the extended block of serial samples to parallel-to-serial converter 15. Cyclic insertion function 14 may follow rather than precede parallel-to-serial converter 15 in the transmission sequence, in some implementations. In either case, the time-domain serial sequence, as may be upsampled (not shown) as appropriate, is applied to digital filter function 16, which processes the datastream in the conventional manner to remove image components and voice band or Integrated Services Digital Network (ISDN) interference. The filtered digital datastream signal is converted into the analog domain by digital-to-analog converter 17. After conventional analog filtering and amplification (not shown), the resulting DMT signal is transmitted over a channel LP, over some length of conventional twisted-pair wires, to a receiving DSL modem 20, which, in general, reverses the processes performed by the transmitting modem to recover the input bitstream as the transmitted communication.

At receiving DSL modem 20, analog-to-digital conversion 22 converts the filtered analog signal into the digital domain, following which conventional digital filtering function 23 is applied to augment the function of pre-conversion receiver analog filters (not shown). A time domain equalizer (TEQ) (not shown) may apply a finite impulse response (FIR) digital filter to effectively shorten the length of the impulse response of the transmission channel LP. Frame alignment function 24 receives the sequence of filtered digital samples, and arranges these samples into frames, by removing the cyclic extension from each block of samples, and by performing serial-to-parallel conversion to apply a block of samples (2N) to Discrete Fourier Transform (DFT) function 27. DFT function 27 recovers the modulating symbols at each of the subchannel frequencies, by reversing the IDFT performed by function 13 in transmission. The output of DFT function 27 is a frequency domain representation of the transmitted symbols multiplied by the frequency-domain response of the effective transmission channel. Frequency-domain equalization (FEQ) function 28 divides out the frequency-domain response of the effective channel, recovering the modulating symbols, each representable as a point in a QAM constellation. Constellation decoder function 29 then resequences the symbols into a serial bitstream, decoding any encoding that was applied in the transmission of the signal and producing an output bitstream that corresponds to the input bitstream upon which the transmission was based. This output bitstream is then forwarded to the client workstation, or to the central office network, as appropriate for the location.

It is well known in the art, and will be apparent to the reader from this description, that the demodulation and recovery of data by receiving modem 20 requires synchronized timing with transmitting modem 10. This synchronization includes clock synchronization (in both frequency and phase), and also frame synchronization (synchronization of groups of bits). Clock synchronization is essential so that the sampling of the received signal by ADC 22 is accurate, and remains accurate over many sample periods. Frame synchronization of course ensures that the grouping of digital samples at demodulation by DFT 27, in receiving modem 20, corresponds to the same grouping of digital values that were modulated by IDFT 13 of transmitting modem 10; frame misalignment results in inter-symbol interference (ISI), as known in the art. However, also as known in the art, there is no extrinsic clock signal communicated from transmitting modem 10 to receiving modem 20. Rather, receiving modem 20 must derive the transmit clock from the received signals themselves. As such, receiving modem 20 includes timing recovery function 25, which receives signals from before and after demodulating DFT 27, and that generates a sample clock applied to ADC 22 (and generates other clock signals controlling other functions within receiving modem 20, such as frame alignment function 24).

FIG. 2 illustrates the construction of conventional timing recovery function 25. According to this conventional construction, a phase-locked loop consisting of phase/frequency detector (PFD) 2, low pass filter 4, and voltage-controlled oscillator (VCO) 5 generates sample clock $f_s$ from a timing signal based on the demodulated output signal of DFT 27. Typically, as known in the art, PFD 2 generates a phase error signal $\phi\_e$ based on observed rotations of a demodulated (i.e., DFT) pilot tone within the received signal. For example, a phase or frequency error in the sampling and demodulating of a received signal will appear as a phase rotation in the complex plane; this phase rotation can be detected for the pilot tone, because the QAM-modulated data is known by receiving modem 20. This phase error signal $\phi\_e$ is filtered by low-pass filter 4 to produce a control signal that is applied to VCO 5. VCO 5 generates and adjusts the timing of sample clock $f_s$ in response to the filtered phase error signal.

In addition, conventional timing recovery function 25 includes frame offset estimate function 3. According to conventional approaches, frame_offset estimate function 3 determines the extent of an offset between the frame boundaries detected by frame alignment function 24 and the true frame boundaries. This offset is detectable by analyzing the demodulated pilot tone, or by identifying the cyclic extension in the received signal prior to demodulation, and generates feedback signal frame_offset based on that determination. Frame alignment function 24 adjusts its operation in response to feedback signal frame_offset, to reduce or eliminate ISI. Typically, frame_offset estimate function 3 is operable only during training of modems 10, 20 for the session, based on the assumption that, in showtime, phase and frequency error will not become so large as to lose frame synchronization.

While this conventional timing recovery approach has proven useful in DSL communications, several limitations in its operation have been observed, in connection with this invention. Because only phase error (i.e., phase error signal $\phi\_e$) is fed back to VCO 5, the actual phase error may exceed the "pull-in" range of the phase-locked loop of PFD 2, filter 4, and VCO 5. Of course, this phase-locked loop can be constructed to increase its pull-in or lock-in range, but these higher requirements necessarily require more complexity in these circuit functions, and thus substantially higher cost. Furthermore, because only the single pilot tone signal is analyzed by PFD 2 to determine the phase error, corruption of the pilot signal due to noise or attenuation directly affects the precision of the timing recovery. Indeed, if sufficient noise or attenuation is present at the pilot tone frequency, timing may be frequently destroyed, in turn requiring frequent re-initialization of the DSL session.

BRIEF SUMMARY OF THE INVENTION

It is therefore an object of this invention to provide timing recovery circuitry, and a method of operating the same, in which phase error, frequency error, and frame offset are detected and analyzed in combination with one another.

It is a further object of this invention to provide such circuitry and such a method in which frame synchronization is performed not only during initialization, but is also maintained during showtime.

It is a further object of this invention to provide such circuitry and such a method in which the individual components of offset and error are addressed and compensated, resulting in improved precision and stability in the timing recovery operation.

It is a further object of this invention to provide such circuitry and such a method that can perform timing recovery based on multiple tones of the received discrete multitone modulation signal.

It is a further object of this invention to provide an efficient realization of such circuitry and such a method, based on the combined analysis of phase error, frequency error, and frame offset.

Other objects and advantages of this invention will be apparent to those of ordinary skill in the art having reference to the following specification together with its drawings.

The present invention may be implemented into timing recovery functionality or circuitry in a modem for digital subscriber line (DSL) communications. According to this invention, circuitry measures phase rotation from one or more tones during training or showtime. This phase rotation is analyzed over multiple tones and multiple frames. Frame misalignment is determined from the extent to which the phase rotation is constant over multiple tones and multiple frames. Phase error is determined from the extent to which phase rotation is constant over multiple frames, but varies from tone to tone within frames, while frequency offset is determined from the extent to which phase rotation varies at a constant rate over multiple frames. Based on these determinations, precise corrections in frame alignment, phase adjustment, and frequency adjustment are made.

BRIEF DESCRIPTION OF THE SEVERAL VIEWS OF THE DRAWING

FIGS. 7a through 7c are flow diagrams illustrating, in more detail, specific functions in the operation of the timing recovery function as illustrated in FIG. 6, according to the preferred embodiment of the invention.

DETAILED DESCRIPTION OF THE INVENTION

The present invention will be described in connection with its preferred embodiment, namely as implemented into digital subscriber line (DSL) modulator/demodulator (modem) equipment, and methods of operating the same according to the asynchronous digital subscriber line (ADSL) communications protocols. However, it is contemplated that this invention will also be beneficial in other loop-based communications systems and protocols according to which timing recovery from received signals, particularly signals arranged according to frames, is performed. Accordingly, it is to be understood that the following description is provided by way of example only, and is not intended to limit the true scope of this invention as claimed.

Figure 1:
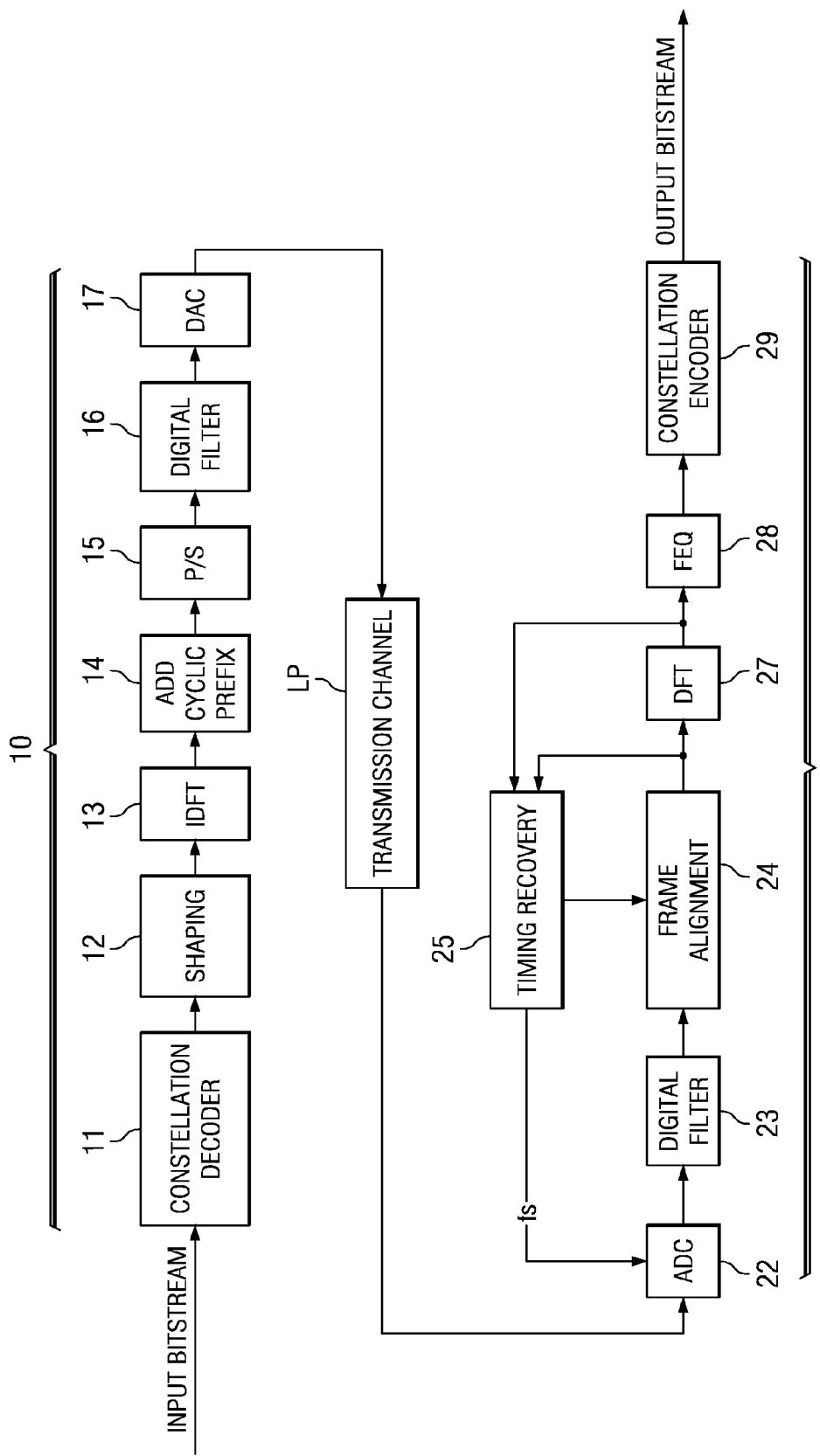
FIG. 1 is a functional diagram, in block form, illustrating conventional DSL communications, in one direction by way of example.
Figure 2:
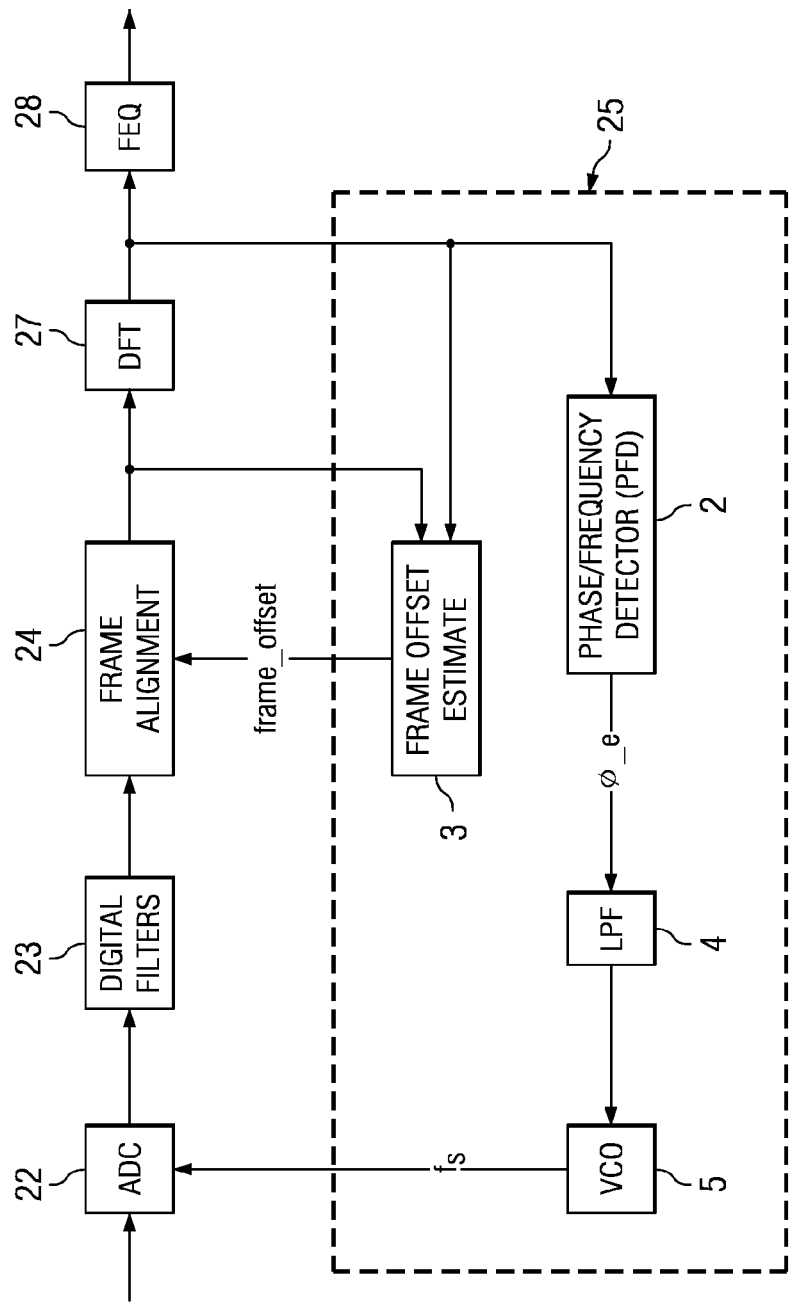
FIG. 2 is an electrical and functional diagram, in block form, illustrating the construction and operation of timing recovery in a conventional DSL modem.
Figure 3:
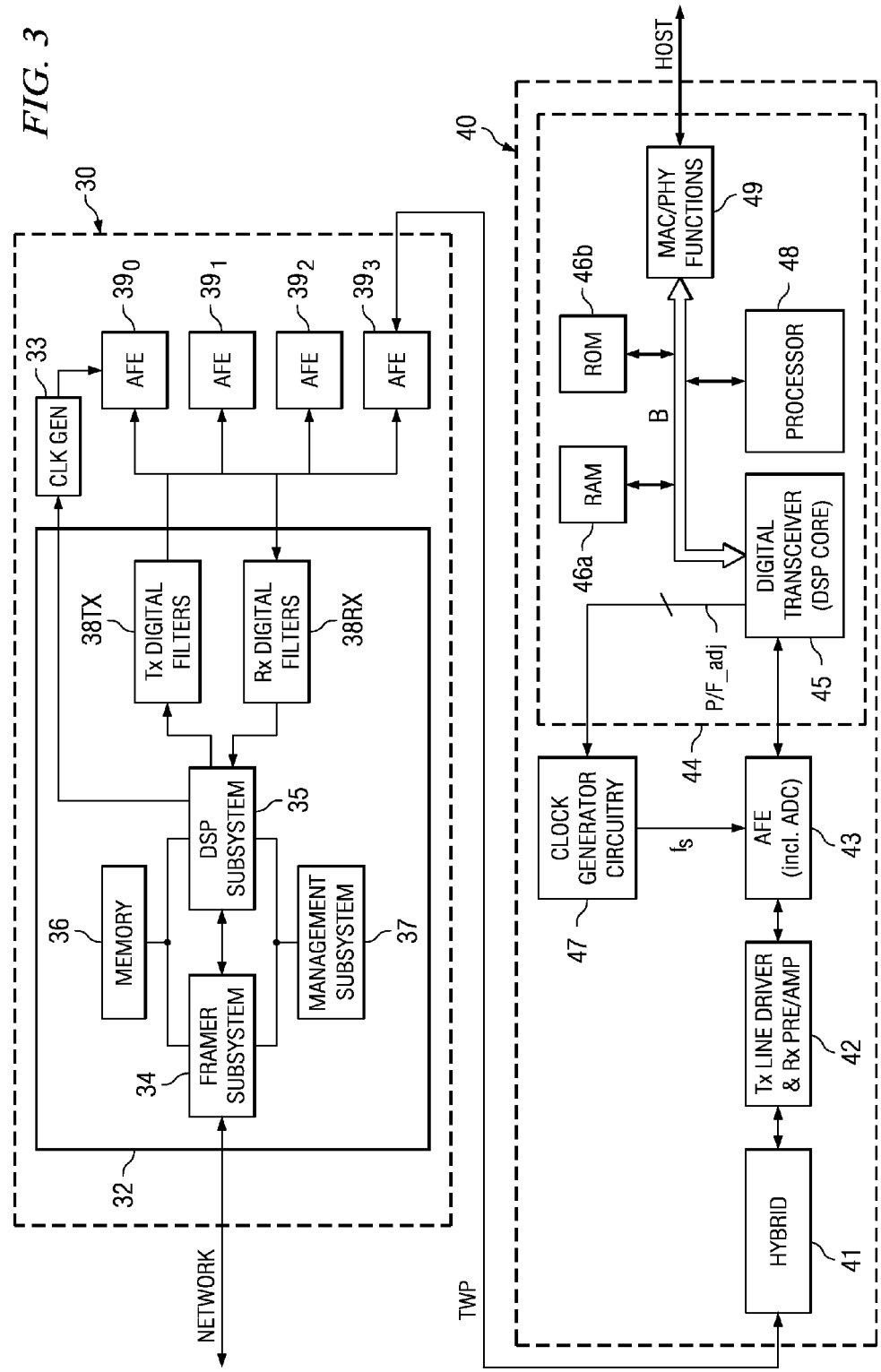
FIG. 3 is an electrical diagram, in block form, of the construction of DSL modems in communication in a DSL communications session, according to the preferred embodiment of the invention.

Referring first to FIG. 3, the construction of an example of central office (CO) modem 30 and customer premises equipment (CPE) modem 40 in a DSL communications link will now be described, by way of example. The architectures of CO modem 30 and CPE modem 40 illustrated in FIG. 3 correspond to modern implementations of these transceiver systems, as will be evident from the following description. However, those skilled in the art having reference to this specification will readily comprehend that CO modem 30 and CPE modem 40 can be realized by way of other alternative architectures from those shown and described in this specification, and that the architectures shown and described in this specification are presented by way of example only.

CO modem 30 in this example is based on the AC7 ADSL Infrastructure Chipset available from Texas Instruments Incorporated. As such, CO modem 30 includes transceiver 32, which may be realized by way of the TNETD7160 sixteen-port single-chip transceiver available from Texas Instruments Incorporated; in this example, only four ports are shown as coupled to transceiver 32, by way of analog front-end functions $39_0$ through $39_3$, for the sake of clarity.

Transceiver 32 in this example includes framer subsystem 34, which is a programmable logic function that communicates with the network functions within the central office, and that manages the conversion of network data into and out of the frames used in DSL communications, in the conventional manner. Management subsystem 37 is also provided within transceiver 32, for managing the operation of transceiver 32, including the generation of the necessary system clock signals, interfaces to the user or to host equipment including CO modem 40, power management, and the like. Transceiver 32 also includes DSP subsystem 35, which is programmable logic in the form of a programmable digital signal processor, and which manages DSL transmit functions including constellation encoding, spectral shaping, and inverse DFT modulation, and which also manages DSL receive functions including DFT demodulation, FEQ, and constellation decoding. It is contemplated that DSP subsystem 35 will be realized by a DSP core of sufficient computational capacity to perform these DSL modulation and coding functions for the ports supported by transceiver 32; an example of such a powerful core corresponds to the C62x family of digital signal processors available from Texas Instruments Incorporated. Memory 36 is provided within transceiver 32 for program and data storage as appropriate for the operation of transceiver 32, such program storage including storage of the instruction sequences used in performing the functions described in this specification, according to the preferred embodiment of the invention. DSP subsystem 35 communicates modulated data to be transmitted to transmit digital filters 38TX, while the data to be demodulated by DSP subsystem 35 are received via receive digital filters 38RX. Digital filters 38TX, 38RX are coupled to each of analog front-end functions $39_0$ through $39_3$, in this example.

Each of analog front-end functions 39 includes the conventional analog functions such as a hybrid coupler for bidirectionally coupling to conventional twisted-pair telephone wire, a line driver and a receiver preamplifier for transmit and receive amplification, respectively, analog filters for both the transmit and receive signals, and also a conventional codec (coder/decoder). Digital-to-analog conversion and analog-to-digital conversion functions are also included within analog front-end functions 39, in the conventional manner. An example of a suitable integrated analog front-end function 39 is the TNETD7122 dual-channel integrated front-end, available from Texas Instruments Incorporated.

In this example, analog front-end function $39_3$ is coupled to twisted-pair wire facility TWP, which carries DSL downstream and upstream communications between CO modem 30 and CPE modem 40 in the DSL link shown in FIG. 3 in this example. In CPE modem 40, hybrid coupler 41 is connected to twisted-pair wire facility TWP to maintain separation of upstream signals from downstream signals, and in turn is coupled to transmit line driver and receive preamplifier function 42. Analog front-end function 43 is coupled to line drive and preamplifier function 42, and includes the necessary analog filters, codec, and digital-to-analog conversion (and vice versa) as used for DSL communications in the conventional manner. An example of a suitable analog front-end function 43 for CPE modem 40 is the AFE1302 ADSL analog front-end available from Texas Instruments Incorporated.

In this example, CPE modem 40 includes transceiver 44, which is realized in an architecture corresponding to the AR7 single-chip ADSL transceiver, available from Texas Instruments Incorporated; other suitable architectures and realizations for transceiver 44 in CPE modem 40 include the UR8 residential gateway product family available from Texas Instruments Incorporated. In the example of FIG. 3, transceiver 44 includes digital transceiver function 45, coupled to analog front-end function 43 via the appropriate interface. Digital transceiver function 45 is preferably realized as a DSP core with sufficient computational capacity to perform DSL transmit functions including constellation encoding, spectral shaping, and inverse DFT modulation, and to perform DSL receive functions including DFT demodulation, FEQ, and constellation decoding. Examples of DSP cores suitable for digital transceiver function 45 include those in the C62x family of digital signal processors available from Texas Instruments Incorporated. Digital transceiver function 45 is coupled to random access memory (RAM) 46a, and read-only memory (ROM) 46b within transceiver 44 via bus B. ROM 46b and RAM 46a of course provide program and data storage, respectively, as appropriate for the operation of transceiver 44. It is contemplated that ROM 46b will include program memory storing the instruction sequences used in performing the functions described in this specification, according to the preferred embodiment of the invention.

Transceiver 44 also includes processor 48, which is responsible for management of the operation of transceiver 44, in the conventional manner. According to the AR7 architecture mentioned above, processor 48 may be realized as a thirty-two-bit MIPS microprocessor. Processor 48 is coupled to bus B, as is MAC/PHY function block 49, which performs the higher layer functions on the data to be transmitted and that received over the DSL link, and communicates that data to and from a host system. The specific interfaces for communication with the host system, and with other functions at the location of CPE modem 40 (especially if CPE modem 40 serves as a router, or as a residential gateway for telephone and other services), may also be provided in CPE modem 40, but are not shown in FIG. 3 for the sake of clarity.

As mentioned above, the particular architectures and implementation details described above and shown in FIG. 3 are presented by way of example only. Variations to and substitutes for these modem implementations and architectures may alternatively be used, without departing from the scope of this invention.

CPE modem 40 includes functionality and circuitry for performing timing recovery according to the preferred embodiment of the invention. As shown in FIG. 3, clock generator circuitry 47 is included within CPE modem, for generating sample clock $f_s$ that is applied to the analog-to-digital conversion (ADC) function of AFE 43. This sample clock $f_s$ is generated and adjusted (in phase and in frequency) based on signals from digital transceiver 45 in this embodiment of the invention, as communicated on lines P/F_adj as shown in FIG. 3. As such, clock generator circuitry 47 preferably includes a voltage controlled oscillator (VCO), or a numerically controlled oscillator (NCO), for generating this sample clock $f_s$ in response to these signals on lines P/F_adj. According to this embodiment of the invention, digital transceiver 45 includes functionality for executing program instructions (e.g., stored in program memory of ROM 46b) that analyze phase rotation in the digital data as demodulated within digital transceiver 45, and for generating adjustment signals P/F_adj in response to that analysis, both as described in further detail below. It is contemplated that this analysis may be performed entirely in the digital domain by digital transceiver 45, in which case adjustment signals P/F_adj may represent digital values applied to clock generator circuitry; alternatively, some or all of the generation of the phase and frequency adjustment signals may be generated partially in the analog domain, in which case one or more low pass analog filters may be included within CPE modem 40, and in which case clock generator circuitry 47 may be realized to include a VCO that produces sample clock $f_s$ in response to an analog control voltage. Those skilled in the art having reference to this specification will be readily able to derive these and other variations to the particular functions described herein. In any event, the timing recovery performed by CPE modem 40 according to this preferred embodiment of the invention is performed from received downstream signals, based on signals transmitted from CO modem 30.

As also known in the art, DSL communications also involve upstream traffic transmitted from CPE modem 40 to CO modem 30. As such, CO modem 30 also includes timing recovery functionality, so that sampling of the upstream transmissions can be precisely and accurately gathered. As such, referring to the example of FIG. 3, CO modem 30 includes clock generator circuitry 33, which generates sample clocks for the analog-to-digital conversion in each of AFEs 39, under the control and adjustment of signals from DSP subsystem 35. It is contemplated that the approach for timing recovery from the upstream signals may be also be performed in the manner described in this specification; indeed, it is contemplated that the preferred embodiment of the invention may be used for timing recovery from either upstream or downstream DSL communications, or both. Because CO modem 30 supports multiple ports, and because DSL communications are synchronous with the transmitting modem, each of AFEs 39 will receive a different sample clock from the others of AFEs 39, at a frequency and phase that depends upon the specific CPE modem transmitting that upstream traffic, as well as the channel conditions.

Figure 4:
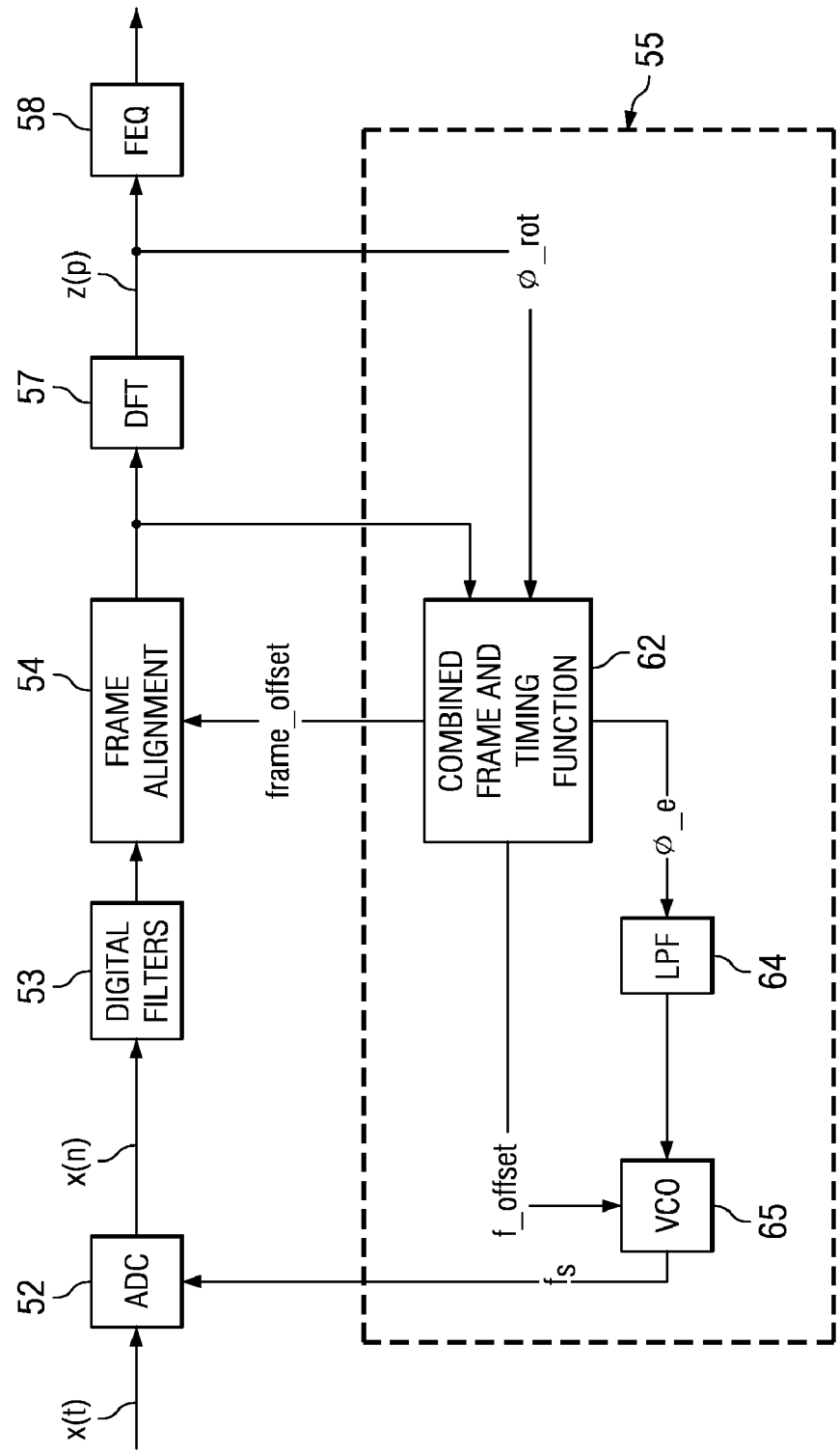
FIG. 4 is an electrical and functional diagram, in block form, illustrating the construction and operation of timing recovery functions in a DSL modem according to the preferred embodiment of the invention

Referring now to FIG. 4, the functional construction of timing recovery circuitry 55 in the receiving side of modems 30, 40 will now be described in further detail. As discussed immediately above, it is contemplated that this functionality will be realized by programmable digital logic executing program instructions, to the extent that these functions are carried out in the digital domain; as such, it is contemplated that the functions of FIG. 4 will primarily be carried out by digital transceiver 45 and clock generator circuitry 47 of CPE modem 40 for downstream traffic, and by DSP subsystem 35 and clock generator circuitry 33 of CO modem 30 for upstream traffic. Of course, it is also contemplated that custom logic and other hardware may also be implemented within CO modem 30 and CPE modem 40 for performing clock recovery according to this preferred embodiment of the invention, or that alternatively other programmable logic separate from that used in demodulation of the received data streams may perform clock recovery according to this preferred embodiment of the invention. Those skilled in the art having reference to this description will be readily able to realize this functionality according to these, and other, implementations and architectures.

The data path illustrated in FIG. 4 includes, as before, analog-to-digital converter (ADC) function 52, which receives the incoming analog signal x(t), after such analog filtering as implemented in the modem, and which samples that data stream as clocked by sample clock $f_s$, to produce sample sequence x(n). Sample sequence x(n), after filtering by digital filters 53, is converted and grouped into "windows" for application of a Fast Fourier Transform (FFT) by DFT demodulator function 57; frame alignment function 54 also comprehends and removes the cyclic extension. The demodulated frequency domain data z(p) produced by DFT function 57 is then applied to frequency domain equalizer (FEQ) 58, for recovery of an estimate of an originally transmitted data sequence s(p) by applying the inverse of an estimate of the channel response function.

As shown in FIG. 4, clock recovery function 55 according to this embodiment of the invention includes combined frame and timing function 62, which receives phase rotated signal φ_rot from the demodulated sequence z(p). Combined frame and timing function 62 also receives frame aligned symbols of the time-domain received sequences x(n) from frame alignment function 54. As will be described below, combined frame and timing function 62 operates, preferably in the digital domain and by executing program instructions stored in program memory of the modem, to derive a frame alignment control signal frame_offset for application to frame alignment function 54, a frequency control signal f_offset for application to voltage controlled oscillator (VCO) 65, and a phase error signal φ_e for application to low pass filter 64. Low pass filter 64 and VCO 65 (which may, alternatively, be realized as a numerically controlled oscillator if operating in the digital domain) complete a phase-locked loop function within timing recovery function 55, in that phase error signal φ_e is filtered by low pass filter 64, with the filtered result used to adjust the phase and frequency of sample clock $f_s$ produced by VCO 65; frequency control signal f_offset more coarsely controls the frequency of sample clock $f_s$ according to this embodiment of the invention. Of course, sample clock $f_s$ may be coupled to ADC function 52, or the clock used by ADC function 52 may be derived from sample clock $f_s$ produced by VCO 65.

The theory of operation of timing recovery function 55 according the preferred embodiment of the invention will now be described, for the example of frame-based DSL communications. For a data sequence s(k) in the frequency domain (i.e., k being the index of subchannel frequency, and each value s(k) being a complex value in the QAM constellation) to be transmitted, the modulated data sequence u(n), n being the index of the sample u(n) within the time-domain sequence, is:

$$u(n) = \frac{1}{\sqrt{N}} \sum_{k=0}^{N-1} s(k) e^{j2\pi kn/N}, n = 0, 1, \ldots, N-1$$

based on the well-known inverse Fourier transform, as used in the modulation of DMT signals. This transmitted signal u(n) is modified by the impulse response h(n) of the transmission channel, and by additive noise w(n), which is typically Gaussian in this application. The resulting signal x(n), after ADC function 52 in the receiving modem, is thus:

$$x(n) = u(n) \hat{\times} h(n) + w(n)$$

where $\hat{\times}$ the convolution operator. Faithful reproduction of the data sequence s(k) at the receiving modem thus involves filtering out the noise w(n), demodulating the received sequence back into the frequency domain, and reversing the channel response h(n) by way of frequency domain equalization. Of course, accurate FFT demodulation requires applying a block of data in the same order and arrangement as that which is modulated by the inverse FFT of the transmitter. This identifying of the data window for the demodulating FFT is the object of frame alignment at the receiving modem of the DSL link.

Figure 5:
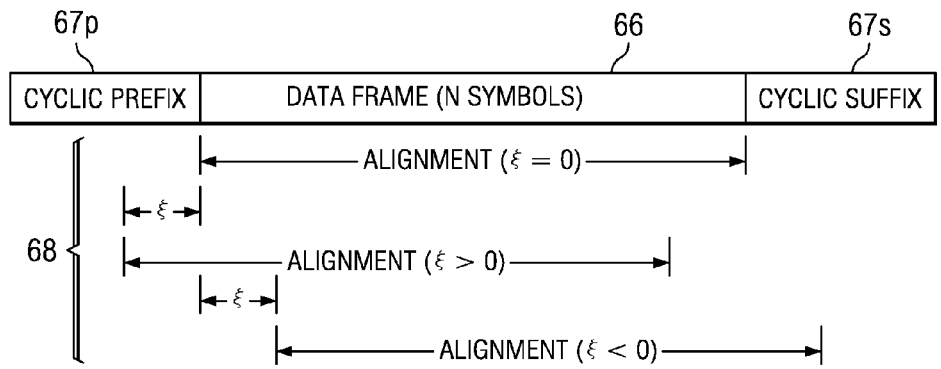
FIG. 5 is a schematic diagram illustrating the relationship of a DSL frame to its cyclic extensions, according to the preferred embodiment of the invention.

FIG. 5 illustrates a typical data frame 66 of N symbols as communicated between CO modem 30 and CPE modem 40 in the link of FIG. 3. As shown in FIG. 5, data frame 66 includes both prepended cyclic prefix 67p, and appended cyclic prefix 67s. Cyclic extensions 67p, 67s are used to roughly align the window of symbols that is to be demodulated by DFT function 57, in the conventional manner. Following such rough alignment, FFT window 68 may be perfectly aligned with data frame 66, such that misalignment ξ is zero. On the other hand, FFT window 68 may be aligned slightly early (misalignment ξ>0), or slightly late (misalignment ξ<0), relative to data frame 66. With a reasonable rough frame alignment, one can express the time domain output sequence z(p) of the FFT by demodulating DFT function 57 as:

$$z(p) = \frac{1}{\sqrt{N}} \sum_{k=0}^{\xi-1} x(N - \xi + k) e^{-j2\pi kp/N} + \frac{1}{\sqrt{N}} \sum_{k=\xi}^{N-1} x(k - \xi) e^{-j2\pi kp/N}$$

for $p = 0, 1, \ldots, N-1$. This may, in turn, be expressed as:

$$z(p) = \frac{1}{\sqrt{N}} \sum_{k=N-\xi}^{N-1} x(k) e^{-j2\pi(k-N+\xi)p/N} + \frac{1}{\sqrt{N}} \sum_{k=0}^{N-1-\xi} x(k) e^{-j2\pi(k+\xi)p/N}$$

$$= \frac{1}{\sqrt{N}} \sum_{k=0}^{N-1} x(k) e^{-j2\pi(k+\xi)p/N}$$

$$= s(p) e^{-j2\pi \xi p/N}$$

In other words, the output sequence z(p) of DFT demodulating function 57 can be expressed as the original data sequence s(p) with a phase rotation term. One may also express this sequence z(p) in terms of the product of the original data sequence s(p) with the frequency domain representation H(p) of the channel frequency response:

$$z(p) = s(p) H(p) e^{-j2\pi \xi p/N}$$

In connection with this invention, one may define $y_i$ as:

$$y_i = \frac{z(p_i)}{s(p_i)} \cdot \frac{z(p_i)^*}{s(p_{i+1})}$$

for tones i and i+1. According to this approach, it can be readily derived that:

$$y_i = \alpha \cdot e^{j2\pi d_i \xi/N}$$

where $d_i = p_{i+1} - p_i$. If one considers the value $y_i$, in radians, as a phase error $\phi_i = \angle y_i$, one can then solve for the phase misalignment ξ from this phase angle $\phi_i$.

The theory of operation of the preferred embodiment of this invention uses a comparison of the demodulated sequences $z(p_i)$ and $z(p_{i+1})$ at tones i and i+1 with the original values of the transmitted data, namely the two sequences $s(p_i)$ and $s(p_{i+1})$ at tones and i+1, to determine the phase error. According to this preferred embodiment of the invention, therefore, this knowledge of the transmitted data sequences at two or more tones is present during training, in which any two or more tones can be selected, for example the two or more tones with the best signal-to-noise ratio. For example, a subset of the even-numbered tones during the "channel discovery" phase of DSL initialization is contemplated to be especially useful in connection with this invention. This analysis can also be performed during showtime, through the use of a decision feedback technique (i.e., comparing the data as received and demodulated, for a given tone, with a QAM constellation defined by the "decisions" made from previously demodulated data).

This preferred embodiment of the invention permits analysis of the phase error $\phi_i$ using multiple tones, and in a manner that enables determination of the contributions to phase error $\phi_i$ due to frame misalignment, frequency offset, and phase offset. It has been discovered, in connection with this invention, that phase error in the demodulated output signal from DFT function 57 of the receiving modem, relative to the phase of the transmitted sequence, is caused by many factors. As noted above, frame misalignment, frequency offset, and phase offset contribute strongly to this phase error.

Other causes of phase error include frequency and phase jitter at the receiver, and phase rotation of the frequency response of the transmission channel. However, it is contemplated that the phase-locked loop arrangement of timing recovery function 55 can compensate adequately for the effects of frequency and phase jitter, and that frame alignment function 54 and FEQ function 58 adequately address the effects of phase rotation in the channel response, in the conventional manner, for typical DSL communications links.

Figure 6:
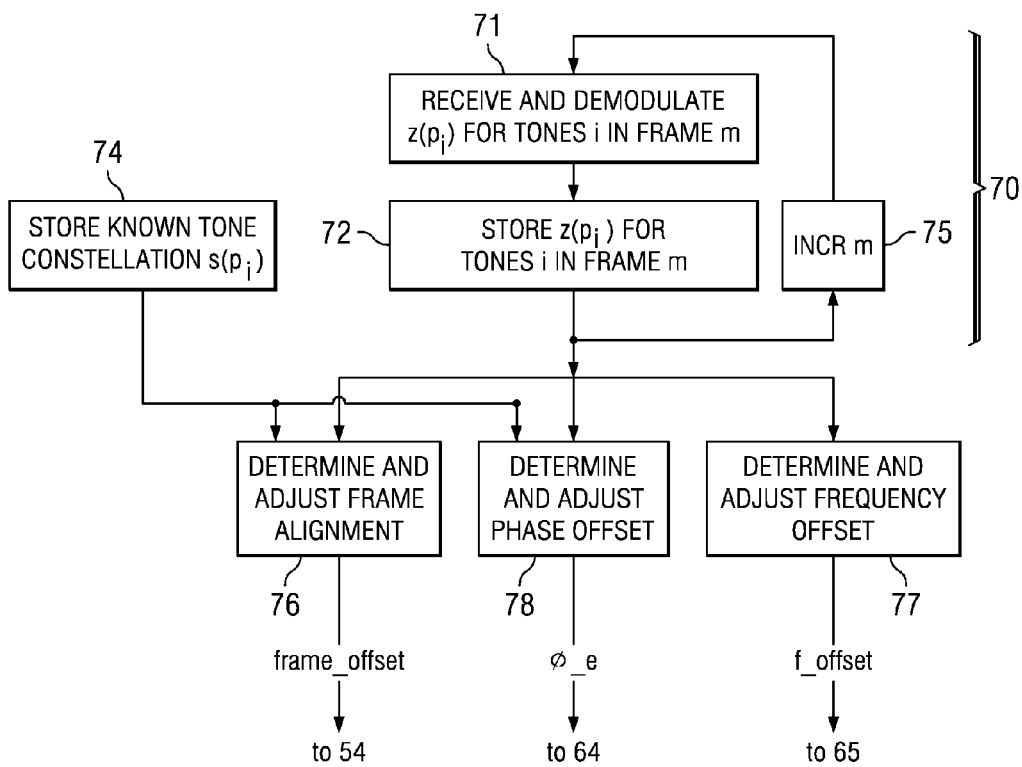
FIG. 6 is a flow diagram illustrating the general operation of the timing recovery function according to the preferred embodiment of the invention.

Referring now to FIG. 6, the operation of combined frame and timing function 62 according to the preferred embodiment of the invention, will now be described. As mentioned above, it is contemplated that combined frame and timing function 62 will preferably be realized as programmable logic circuitry, either within digital transceiver 45 (if realized in CPE modem 40 for downstream traffic) or DSP subsystem 35 (if realized in CO modem 30 for upstream traffic) or by way of other programmable logic, in any case executing a sequence of program instructions stored in program memory within CO modem 30 or CPE modem 40, as the case may be. Alternatively, combined frame and timing function 62 may be realized in part or in whole by custom or semi-custom logic dedicated to this function, if desired. It is contemplated that those skilled in the art having reference to this specification will be readily able to realize combined frame and timing function 62, without undue experimentation, by way of software or hardware or a combination of the two, based on a description of the operation of this function 62, which will now be provided in connection with FIG. 6.

This description of the operation of FIG. 6 will be provided with reference to CPE modem 40, by way of example. Of course, it is contemplated that a similar approach may also be followed by CO modem 30 in performing timing recovery of upstream traffic.

FIG. 6 illustrates the overall operation of combined frame and timing function 62 in generating its control signal outputs for controlling frame alignment, phase offset, and frequency offset. According to this embodiment of the invention, combined frame and timing function 62 produces control signal frame_offset that is applied to frame alignment function 54 to adjust frame alignment, control signal f_e that is applied as a phase error signal to low pass filter 64 in the phase-locked loop, and control signal f_offset that is applied to VCO 65 to more coarsely adjust the frequency of sample clock $f_s$. This overall control function begins (and continues with) process 71, in which a frame m of data is received and demodulated, to produce frequency domain output signal $z(p_i)$ at the output of DFT demodulating function 57; as before, i is the index of tones, or subcarriers, in the DSL multitone signal. The values of this frequency domain output signal $z(p_i)$ for all of a plurality of tones i for the data in frame m are stored in memory, in process 72. It is contemplated that the demodulated values for two or more tones i will be stored in process 72; preferably, the values for a relatively large set of tones i, for example all even-numbered tones having a bit loading $b_i$, of more than two bits, will be stored in process 72. The frame index m is incremented in process 75, and the demodulation and storing processes 71, 72 will be repeated for another frame.

In addition, in process 74, the constellation values $s(p_i)$ for a frame are stored in memory of CPE modem 40, for use in determination of the phase error and associated corrections as will be described later. It is contemplated that this preferred embodiment of the invention can be used during training of the DSL link, in which case the stored known tone constellation values $s(p_i)$ correspond to the known values in a data sequence known by both CO modem 30 and CPE modem 40 (for both downstream and upstream communications). For example, in the "channel discovery" phase of initialization or training under the ADSL standard ITU-T G.992.3, "Asymmetric digital subscriber line transceivers 2 (ADSL2)", (International Telecommunication Union, January 2005), such standard incorporated herein by reference, various sequences of multiple symbols of a known pattern (e.g., a pseudo-noise pattern as used in other initialization states) are transmitted over a subset of tones (e.g., sixteen tones). As such, CPE modem 40 has the symbol values for these tones previously stored in its firmware or program memory, in order to carry out initialization. Such predetermined storage of known tone constellation values $s(p_i)$ corresponds to process 74 of FIG. 6.

It is also contemplated that the timing recovery procedure realized through combined frame and timing function 62 is also operable during showtime, i.e., during the transmission and receipt of payload information. Of course, the received data values are not known a priori during showtime. However, it is contemplated that combined frame and timing function 62 can implement a decision feedback type of analysis to derive and store the "known" tone constellation values $s(p_i)$ received in a frame. Specifically, FEQ function 58 and other conventional DSL receive functions eventually derive a final "decision" for the demodulated data value from DFT function 57. These final "decisions" amount to selecting the true QAM constellation point to which each demodulated data value $z(p_i)$ corresponds. In this example, these final "decisions" are stored, for tones i of frame m, for example in memory 46a of CPE modem 40, by the operation of process 74.

As shown in FIG. 6, processes 76, 77, and 78 for the adjustment of frame alignment, frequency offset, and phase offset, respectively, can be performed effectively in parallel, according to this preferred embodiment of the invention. It is contemplated, however, that it is preferred to ensure that frame alignment is initially perfect or close to perfect (i.e., $\xi=0$) through the operation of process 76 in initialization, before starting phase offset adjustment process 78, considering that the magnitude of the phase error is quite large in the case of non-zero frame misalignment. During showtime, however, it is contemplated that the three processes 76, 77, 78 can operate substantially in parallel with one another.

Referring now to FIG. 7a, the operation of frame alignment process 76 according to this preferred embodiment of the invention will be described. As discussed above, the known tone constellation values $s(p_i)$ are provided by process 74 (whether from decision feedback or based on known training sequences), and the frequency domain output signal $z(p_i)$ are provided by process 70; these sets of values are provided, of course, for the same set of tones i over the same M frames. It has been realized, in connection with this invention, that phase misalignment appears as a phase error that is constant across tones within a frame, and that is constant across multiple frames. Conversely, the extent that the measured phase error is constant over multiple tones and multiple frames corresponds to the extent to which frame misalignment is present. Accordingly, process 76 begins with the estimation of the phase offset $\angle y_i$ for a pair of tones i and i+1 (the "$i^{th}$ tone pair"), in process 80. This phase offset can be readily determined from the knowledge of the values $s(p_i)$, $z(p_i)$ for that tone pair i in the $m^{th}$ frame according to the relationship described above:

$$\angle y_i = \frac{z(p_i)}{s(p_i)} \cdot \frac{z(p_i)^*}{s(p_{i+1})}$$

Based on this determination for each tone pair in each frame, combined frame and timing function 62 derives an estimate of the instantaneous frame offset $\tilde{\xi}_i(m)$, for frame m, in process 81:

$$\tilde{\xi}_i(m) = \text{floor}\left(\frac{N \cdot \angle y_i}{2\pi d_i}\right)$$

where $d_i = p_{i+1} p_i$, or the difference between tones i and i+1, as before. Next, these instantaneous frame offset values per tone pair are averaged over the tones within each of the frames m under analysis, on a frame by frame basis, in process 82:

$$\tilde{\xi}(m) = \sum_{i,s,t,p_i \in P_s} \tilde{\xi}_i(m) / O(P_S)$$

$P_s$ being the number of tone pairs per frame. Finally in process 84, this average frame offset value over tones within a frame is averaged, over all M frames, to derive an estimate of the frame misalignment, or frame offset $\tilde{\xi}$:

$$\tilde{\xi} = \sum_m \tilde{\xi}_i(m) / M$$

In process 86, combined frame and timing function 62 produces a control signal frame_offset based on this estimated frame offset $\tilde{\xi}$, and applies that control signal to frame alignment function 54. In response, frame alignment function 54 adjusts the frame alignment by an amount corresponding to estimated frame offset $\tilde{\xi}$. The process is then repeated to determine whether further frame alignment adjustment is required.

It has been observed, in connection with this invention, that phase error due to phase shift in the complex channel response is constant from frame to frame, but varies from tone to tone within a frame (i.e., this cause of phase error is frequency dependent). On the other hand, phase error due to the combined effects of phase offset and frequency offset has been observed to be constant across tones within each frame, but vary from frame-to-frame (i.e., varies over time). It has also been observed, in connection with this invention, that frequency offset (i.e., the difference in frequency between the sample clock $f_s$ and the sample frequency at the transmitter of CO modem 30) is reflected as a constant velocity (i.e., constant rate of change over time) of the phase rotation, from frame-to-frame; conversely, the "AC" component of variations in phase error over time corresponds to phase noise that can be corrected by the phase-locked loop arrangement of low pass filter 64 and VCO 65.

Referring now to FIG. 7b, the operation of process 77 in determining the phase error due to frequency offset, according to the preferred embodiment of the invention, will now be described. In this regard, assuming some non-zero frequency offset $\epsilon$:

$$\varepsilon = \frac{\Delta f}{f}$$

namely, the rate of change of frequency relative to the frequency itself, one can readily express the $l^{th}$ DMT symbol applied to the input of DFT function 57 as the time domain sequence:

$$x(k) = \frac{1}{\sqrt{N}} \sum_{n=0}^{N-1} S(n) H(n) e^{j2\pi kn/N} \cdot e^{j2\pi k\epsilon(lN_S+k)/N} + v(k)$$

where $v(k)$ is a noise term, and where $N_s$ is the length of the symbol applied to DFT function. One can readily derive the relationship of this time domain signal if it is shifted in time (i.e., shifted by $N_s$ samples):

$$x(k+N_s) = x(k) e^{j2\pi\epsilon}$$

where, as stated above, $\epsilon$ represents the frequency offset. Cross-correlation between one symbol $x(k)$ and the next $x(k+1)$ can thus recover an estimate of this frequency offset $\epsilon$, according to this embodiment of the invention:

$$x^*(k) x(k+N_s) = \alpha e^{j2\pi\epsilon}$$

$\alpha$ being merely a numerical constant corresponding to any difference in the data between successive time-domain symbols $x(k)$.

Therefore, referring to FIG. 7b, frequency offset adjustment process 77 begins with the cross-correlation of successive symbols $x(k)$ and $x(k+1)$ from frame alignment block 54, in process 88. It is contemplated that cross-correlation process 88 can be readily performed by programmable logic executing program instructions corresponding to that function, as used to realize combined frame and timing function 62 as described above. The output of cross-correlation process 88 is time-averaged by combined frame and timing function 62 over several frames, in process 90, following which combined frame and timing function 62 can generate the appropriate control signal f_offset, for application to VCO 65 in process 92. This control signal f_offset directly adjusts the frequency of sample clock $f_s$ generated by VCO 65; for example, control signal f_offset may be a digital word applied to the digital input to VCO 65 when realized as a numerically-controlled (i.e., digital) oscillator. This input to VCO 65 may be the same control input receiving the filtered phase offset signal via low pass filter 64; in the case of control signal f_offset, however, low pass filtering is not required, considering that the adjustment of the frequency of sample clock $f_s$ responsive to control signal f_offset is relatively coarse, and infrequent, as compared with adjustment in response to phase errors. Combined frame and timing function 62 will continue to monitor received symbols to adjust control signal f_offset over time, and during showtime, as necessary.

The ability of combined frame and timing function 62 to adjust VCO 65 for frequency offset provides the important advantage of effectively increasing the pull-in range of the phase-locked loop of low pass filter 64 and VCO 65 from beyond that provided by its response to phase error signal φ_e (as will be described below). This improved pull-in range is provided without increasing the complexity of the phase-locked loop, and thus without adding significantly to the cost of implementing timing recovery function 55 according to this embodiment of the invention. Furthermore, the ability to directly adjust the frequency of VCO provided by combined frame and timing function 62 greatly improves the tracking time of the phase-locked loop of low pass filter 64 and VCO 65 from that provided by its response to phase error signal φ_e alone.

According to the foregoing description, phase rotation that is constant across tones and across frames corresponds to frame misalignment, while phase rotation that varies at a constant speed from frame-to-frame corresponds to frequency offset between the sample clock and the frequency of the transmitted data. Processes 76 and 77, described above, adjust the operation of timing recovery function 55 for the contributions to phase rotation from those two causes. On the other hand, phase rotation that is constant across tones but that varies from frame-to-frame in a non-constant manner (i.e., as an "AC" component of the time-varying phase rotation) can be considered as phase offset between the sample clock and the phase of the transmitted data. According to the preferred embodiment of the invention, process 78 is performed by combined frame and timing function 62 to adjust the operation of the phase-locked loop of low pass filter 64 and VCO 65 to eliminate that phase offset, as will now be described relative to FIG. 7c.

Assuming the absence of frame misalignment through the operation of process 76, the received time-domain signal x(n) (e.g., at the output of frame alignment function 54) for the $l^{th}$ frame can be considered as:

$$x(k) = \frac{1}{\sqrt{N}} \sum_{n=0}^{N-1} S(n)H(n)e^{j2\pi kn/N} \cdot e^{j\varphi(l)/N} + v(k)$$

with phase error φ(l) corresponding to the phase offset. DFT demodulation function 57 thus provides a frequency-domain representation (again, assuming perfect frame alignment) z(p):

$$z(p) = S(p)H(p)\frac{1}{N}\sum_{k=1}^{N} e^{j\varphi(l)} + ICI + \text{noise}$$

where ICI refers to inter-carrier interference. Assuming an accurate estimated $\tilde{\phi}(l)$:

$$z(p)=S(p)H(p)e^{j\tilde{\phi}(l)}+ICI+\text{noise}$$

According to this invention, however, one can obtain such an estimate of the phase error term $\tilde{\phi}(l)$ from:

$$\angle y_i = \frac{z(p_i)}{s(p_i)} \cdot \frac{z(p_i)^*}{s(p_{i+1})}$$

Accordingly, combined frame and timing function 62 determines an estimate of the phase error for a given frame m from tone pairs of a demodulated output $z(p_i)$ from DFT function 57 (as acquired in process 71), as compared with the known constellation $s(p_i)$ for that frame. As discussed above, this known constellation $s(p_i)$ is retained in memory in process 71 for known sequences transmitted in training or initialization, or alternatively may be derived during showtime using decision feedback. This phase error is estimated in process 94 for each tone pair within the current frame m. Because the phase offset has been observed to be tone-independent, as mentioned above, an average of the phase offset over tones can be used to adjust for phase offset, and as such process 95 derives an average of these phase error estimates over the tone pairs within the current frame m. Processes 94, 95 are then repeated for the next frame (shown by incrementing frame index m in process 97 of FIG. 7c).

As discussed above, phase offset is indicated by the change in phase error over time, for example from frame to frame. As such, combined frame and timing function 62 executes process 96 to determine the difference in average phase offset between two frames, for example frame m and previous frame m−1. Of course, the phase error difference may be taken over frames that are not successive in time, so long as the time delay is accounted for in the determination of process 96. This time-dependent phase error difference is used to generate phase offset control signal φ_e that is applied to low pass filter 64 in the phase-locked loop in process 98, as the phase error signal to be filtered and that adjusts the operation of VCO 65.

According to this preferred embodiment of the invention, however, because the phase error signal φ_e that is applied to low pass filter 64 is a difference signal rather than an absolute phase error value, low pass filter 64 should respond to the integral of that difference signal over time. This integration can be readily implemented in low pass filter 64 by including an additional pole in its filter characteristic. It is contemplated that those skilled in the art having reference to this specification will be readily able to realize that additional pole, according to conventional techniques.

According to this invention, therefore, the time-varying phase error signal applied to the phase-locked loop isolates the contribution of phase offset to the phase error from that due to frequency offset (as determined via process 77), and also from that due to frame misalignment (as determined via process 76). The resulting sample clock $f_s$ generated by timing recovery function 55, as the output of VCO 65, is therefore precisely compensated for these contributing factors, by way of combined frame and timing function 62 in timing recovery function 55. As a result of this preferred embodiment of the invention, precise and efficient timing recovery in a DSL modem is provided, without requiring substantial increases in circuit or computational complexity from those currently used in the art. More specifically, the pull-in range of the phase-locked loop in the timing recovery function is substantially increased, without a corresponding increase in the complexity or precision of the circuit components or computational complexity. In addition, this timing recovery is fully and completely compatible with existing DSL standards, and does not require any special or additional initialization sequence. Furthermore, the timing recovery provided according to this preferred embodiment of the invention is performed over multiple pilot tones, further improving the efficiency and also the fidelity of the timing recovery, and also permitting timing recovery and adjustment during showtime of the DSL communications session, without requiring re-training of the DSL link. Indeed, the preferred embodiment of this invention combines the functions of frame alignment adjustment, frequency offset adjustment, and phase offset adjustment into a single function, which enables further efficiency in the circuit functionality and memory resource utilization in the DSL modem.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of recovering sample timing from a discrete multitone modulated (DMT) signal, comprising the steps of:
    sampling a received DMT signal at a sample frequency;
    demodulating a plurality of frames of the sampled DMT signal to determine symbol values at a plurality of tones of the DMT signal;
    comparing the symbol values at the plurality of tones with known symbol values for the plurality of tones to estimate a phase offset for the plurality of tones;
    averaging the phase offset over the plurality of tones of a first frame;
    adjusting alignment of boundaries of frames for demodulation responsive to the average phase offset over a plurality of tones, and over a plurality of frames; and
    adjusting the sample frequency responsive to the estimated phase offset.

2. The method of claim 1, wherein the step of adjusting the sample frequency comprises:
    determining a difference between the average phase offset over the plurality of tones for a first frame and the average phase offset over the plurality of tones for a second frame; and
    generating a phase error difference signal corresponding to the difference.

3. The method of claim 1, further comprising:
    operating a controllable oscillator to generate a sample clock at a frequency corresponding to the sample frequency;
    integrating the phase error difference signal; and
    adjusting the frequency of the controllable oscillator responsive to the integrated phase error difference signal.

4. The method of claim 3, wherein the integrating step is performed by a low pass filter coupled to an input of the controllable oscillator.

5. The method of claim 4, further comprising:
    detecting a frequency offset in the sampled DMT signal; and
    adjusting the sample frequency responsive to the detected frequency offset.

6. The method of claim 5, wherein the step of adjusting the sample frequency comprises:
    cross-correlating pairs of symbols of the sampled DMT signal;
    averaging results of the cross-correlating step over time, to produce a frequency offset signal; and
    applying the frequency offset signal to the controllable oscillator to adjust the sample frequency.

7. The method of claim 1, further comprising:
    detecting a frequency offset in the sampled DMT signal; and
    adjusting the sample frequency responsive to the detected frequency offset.

8. The method of claim 1, further comprising:
    storing symbol values for the plurality of tones in a memory resource;
    wherein the comparing step comprises:
        comparing the symbol values at the plurality of tones with corresponding ones of the stored symbol values for the plurality of tones.

9. The method of claim 8, wherein the stored symbol values correspond to a known sequence in an initialization procedure.

10. The method of claim 8, further comprising:
    for demodulated symbol values at the plurality of tones of the sampled DMT signal, determining a corresponding constellation point;
    and wherein the storing step comprises:
        storing the corresponding constellation points for the demodulated symbol values in the memory resource.

11. A digital subscriber line modem, comprising:
    communications interface circuitry, coupled to a communications facility, for receiving discrete multitone modulated (DMT) signals from the communications facility and for transmitting DMT signals on the communications facility, the communications interface circuitry comprising circuitry for sampling received DMT signals;
    host interface circuitry, for presenting and receiving digital data;
    digital circuitry for modulating digital data to be transmitted into a DMT signal to be transmitted via the communications interface circuitry, and for demodulating DMT signals received from the communications facility via the communications interface circuitry to recover digital data corresponding to the DMT signals; and
    timing recovery circuitry, for recovering sample timing from the received DMT signals, comprising:
        a controllable oscillator, for generating a sample clock at a sample frequency controlled responsive to a signal at a control input;
        a low pass filter function, having an output coupled to the control input of the controllable oscillator; and
        a combined frame and timing adjustment circuit, having an input coupled to the digital circuitry to receive symbol values at a plurality of tones of the demodulated received DMT signals for a plurality of frames, and for adjusting alignment of boundaries of frames demodulated by the digital circuitry, and for adjusting the sample frequency, responsive to the received symbol values over a plurality of tones.

12. The modem of claim 11, wherein the digital circuitry comprises:
    programmable logic for executing executable instructions;
    program memory for storing instructions by the programmable logic, the executable instructions corresponding to a sequence of operations comprising:
        selecting a sequence of sampled values of the received DMT signal corresponding to frame boundaries, the selected sequence corresponding to a frame of the received DMT signal; and
        applying a discrete Fourier transform (DMT) to the selected sequence of sampled values, to produce the symbol values at a plurality of tones of the demodulated received DMT signals for a plurality of frames.

13. A digital subscriber line modem, comprising:
    communications interface circuitry, coupled to a communications facility, for receiving discrete multitone modulated (DMT) signals from the communications facility and for transmitting DMT signals on the communications facility, the communications interface circuitry comprising circuitry for sampling received DMT signals;
    host interface circuitry, for presenting and receiving digital data;
    digital circuitry for modulating digital data to be transmitted into a DMT signal to be transmitted via the communications interface circuitry, and for demodulating DMT signals received from the communications facility via the communications interface circuitry to recover digital data corresponding to the DMT signals, comprising:

programmable logic for executing executable instructions; and program memory for storing instructions by the programmable logic, the executable instructions corresponding to a sequence of operations comprising:
selecting a sequence of sampled values of the received DMT signal corresponding to frame boundaries, the selected sequence corresponding to a frame of the received DMT signal; and
applying a discrete Fourier transform (DMT) to the selected sequence of sampled values, to produce the symbol values at a plurality of tones of the demodulated received DMT signals for a plurality of frames; and timing recovery circuitry, for recovering sample timing from the received DMT signals, comprising:
a controllable oscillator, for generating a sample clock at a sample frequency controlled responsive to a signal at a control input;
a low pass filter function, having an output coupled to the control input of the controllable oscillator; and
a combined frame and timing adjustment circuit, having an input coupled to the digital circuitry to receive symbol values at a plurality of tones of the demodulated received DMT signals for a plurality of frames, and for adjusting alignment of boundaries of frames demodulated by the digital circuitry, and for adjusting the sample frequency, responsive to the received symbol values over a plurality of tones;

wherein the program memory also stores executable instructions corresponding to a sequence of timing recovery operations comprising:
comparing the symbol values at the plurality of tones with known symbol values for the plurality of tones to estimate a phase offset for the plurality of tones;
averaging the phase offset over the plurality of tones of a first frame; and
adjusting the frame boundaries responsive to the average phase offset over a plurality of tones, and over a plurality of frames.

14. The modem of claim 13, wherein the programmable logic comprises a digital signal processor.

15. The modem of claim 13, wherein the sequence of timing recovery operations further comprises:

adjusting the sample frequency responsive to the estimated phase offset.

16. The modem of claim 15, wherein the operation of adjusting the sample frequency comprises:
determining a difference between the average phase offset over the plurality of tones for a first frame and the average phase offset over the plurality of tones for a second frame;
generating a phase error difference signal corresponding to the difference; and
applying the phase error difference signal to the low pass filter function.

17. The modem of claim 16, wherein the low pass filter function has a characteristic corresponding to integrating of the phase error difference signal.

18. The modem of claim 13, wherein the sequence of timing recovery operations further comprises:
detecting a frequency offset in the sampled DMT signal; and
generating a control signal to the controllable oscillator corresponding to the detected frequency offset.

19. The modem of claim 18, wherein the operation of generating the control signal comprises:
cross-correlating pairs of symbols of the sampled DMT signal;
averaging results of the cross-correlating step over time, to produce the control signal; and
applying the control signal to the controllable oscillator to adjust the sample frequency.

20. The modem of claim 13, further comprising:
a memory for storing symbol values for the plurality of tones in a memory resource;
wherein the comparing operation comprises:
comparing the symbol values at the plurality of tones with corresponding ones of the stored symbol values for the plurality of tones.

21. The modem of claim 20, wherein the stored symbol values correspond to a known sequence in an initialization procedure.

22. The modem of claim 20, wherein the sequence of operations further comprises:
for demodulated symbol values at the plurality of tones of the sampled DMT signal, determining a corresponding constellation point;
and wherein the memory stores the corresponding constellation points for the demodulated symbol values in the memory resource.

* * * * *